US012561265B2

(12) United States Patent
van Dijk et al.

(10) Patent No.: US 12,561,265 B2
(45) Date of Patent: Feb. 24, 2026

(54) CONTROLLER AREA NETWORK TRANSCEIVER AND METHOD FOR THE TRANSCEIVER

(71) Applicant: NXP B.V., Eindhoven (NL)

(72) Inventors: Lucas Pieter Lodewijk van Dijk, Kranenburg (DE); Gerald Kwakernaat, Malden (NL)

(73) Assignee: NXP B.V., Eindhoven (NL)

( * ) Notice: Subject to any disclaimer, the term of this patent is extended or adjusted under 35 U.S.C. 154(b) by 233 days.

(21) Appl. No.: 18/361,702

(22) Filed: Jul. 28, 2023

(65) Prior Publication Data

US 2024/0070099 A1 Feb. 29, 2024

(30) Foreign Application Priority Data

Aug. 24, 2022 (EP) .................................... 22192034

(51) Int. Cl.
*G06F 13/40* (2006.01)
*G06F 1/26* (2006.01)

(52) U.S. Cl.
CPC .............. *G06F 13/40* (2013.01); *G06F 1/266* (2013.01)

(58) Field of Classification Search
CPC ................................. G06F 13/40; G06F 1/266
See application file for complete search history.

(56) References Cited

U.S. PATENT DOCUMENTS 11,431,579 B2 * 8/2022 Hirano ................... H04L 67/131
11,526,605 B2 * 12/2022 Konashi .................... H04L 9/36

2012/0155285 A1 * 6/2012 Smart ..................... H04L 43/50
370/242
2016/0344552 A1 * 11/2016 Sharma ................ G05B 19/418
2017/0013006 A1 * 1/2017 Ujiie ................... H04L 63/1425
2017/0026386 A1 * 1/2017 Unagami .......... H04L 12/40032
2018/0041358 A1 * 2/2018 Kishigami .......... H04L 43/0823
2018/0314572 A1 * 11/2018 Du ....................... G06F 11/0739
2020/0049754 A1 * 2/2020 Hubbard ................ G01R 31/54

(Continued)

OTHER PUBLICATIONS

Infineon Technologies; "Fault Tolerant Different CAN-Transceiver, TLE 6254-2G"; Data Sheet Version 1.4; 24 pages (Jul. 22, 2003).

(Continued)

*Primary Examiner* — Henry Tsai
*Assistant Examiner* — Christopher A Daley

(57) ABSTRACT

The present disclosure relates to a Controller Area Network, CAN, transceiver, comprising: a CAN BUS interface, a transmit data, TXD, interface, a receive data, RXD, interface, a receiver, and a transmitter, wherein the transceiver is configured to receive, via the TXD interface, from a CAN controller, a digital TXD transmit signal representing a frame, wherein the transmitter is configured to generate, at the CAN BUS interface, a BUS signal representing the bits of the frame in a sequence, wherein the transceiver is configured to measure an electrical current of the transmitter, to detect each dominant bit represented by the BUS signal based on the transmitter current, to detect an error sequence of at least six consecutive dominant bits being detected based on the transmitter current, and to generate a control signal representing a fault of the transmitter in response to a detected error sequence.

20 Claims, 9 Drawing Sheets

(56)  References Cited

U.S. PATENT DOCUMENTS

2020/0160629 A1 *  5/2020  Walker .............. H04L 12/40169
2020/0287746 A1 *  9/2020  Kotani  .............. H04L 12/40143

OTHER PUBLICATIONS

Mantis; "TJA1044 High-speed CAN transceiver with Standby mode";
Product Data Sheet; Rev. 7; 29 pages (Jan. 16, 2023).
Texas Instruments; "TCAN1044-Q1 and TCAN1044AV-Q1 Auto-
motive Fault-Protected CAN FD Transceiver with Standby mode";
41 pages (Feb. 2021—revised Dec. 2021).

* cited by examiner

CONTROLLER AREA NETWORK TRANSCEIVER AND METHOD FOR THE TRANSCEIVER

CROSS-REFERENCE TO RELATED APPLICATIONS

This application claims priority under 35 U.S.C. § 119 to European patent application no. 22192034.1, filed Aug. 24, 2022, the contents of which are incorporated by reference herein.

TECHNICAL FIELD

The present disclosure relates to a controller area network (CAN) transceiver and a method for the CAN transceiver

BACKGROUND

CAN buses can be used for communications within vehicles, in particular within automobiles. It will be appreciated that CAN buses also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. A CAN protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

In accordance with a first aspect of the present disclosure, a Controller Area Network, CAN, transceiver is provided. The CAN transceiver comprising: a CAN BUS interface, a transmit data, TXD, interface, a receive data, RXD, interface, a receiver coupled to the CAN BUS interface and the RXD interface, and a transmitter coupled to the TXD interface and the CAN BUS interface, wherein the transceiver is configured to receive, via the TXD interface, from a CAN controller, a digital TXD transmit signal representing a frame comprising a plurality of bits, wherein the transmitter is configured to generate, at the CAN BUS interface, a BUS signal representing the bits of the frame in a sequence, wherein the transceiver is configured to measure an electrical current of the transmitter, referred to as a transmitter current, wherein the transceiver is configured to detect each dominant bit represented by the BUS signal based on the transmitter current, wherein the transceiver is configured to detect an error sequence of at least six consecutive dominant bits being detected based on the transmitter current, and wherein the transceiver is configured to generate a control signal representing a fault of the transmitter in response to a detected error sequence.

In one or more embodiments, the transceiver comprises a first sensor unit, which is arranged and/or configured to measure a first current to supply the transmitter, wherein the first current forms at least a part of the transmitter current.

In one or more embodiments, the transceiver comprises first and second supply terminals for supplying electrical current to the transceiver, wherein the first sensor unit is coupled between the first supply terminal and the transmitter.

In one or more embodiments, the transceiver comprises a second sensor unit, which is arranged and/or configured to measure a second current to supply the transmitter, wherein the transmitter current is based on or formed by a mean value of the first and second current.

In one or more embodiments, the transceiver is configured to detect each dominant bit represented by the BUS signal based on the first and second currents.

In one or more embodiments, the transceiver comprises an evaluation unit connected to the at least one sensor unit such that a sensor signal from each sensor unit can be transmitted to the evaluation unit, wherein the evaluation unit is configured to compare the first current with a predefined first current threshold value and/or the second current with a predefined second current threshold value and wherein the evaluation unit is configured to trigger a positive detection of a dominant bit represented by the BUS signal if the result of the comparison indicates that the first current is greater than the first current threshold value and/or the second current is greater than the second current threshold value.

In one or more embodiments, the transceiver is configured to detect a first time duration of a plurality of successive dominant bits detected based on the transmitter current, wherein the evaluation unit is configured to compare the first time duration with a predefined reference time duration, and wherein the evaluation unit is configured to trigger a positive detection of the error sequence if a result of the comparison indicates that the first time duration is larger than the reference time duration.

In one or more embodiments, the evaluation unit is configured to generate a control signal representing a fault of the transmitter in response to a detected error sequence.

In one or more embodiments, the transceiver comprises at least one shutdown unit configured to at least partially deactivate the transmitter based on the control signal.

In one or more embodiments, the transceiver comprises a first shutdown unit and a second shutdown unit, wherein the two shutdown units are configured to jointly deactivate the transmitter based on the control signal.

In one or more embodiments, the evaluation unit is coupled to each shutdown unit to transmit the control signal to each of the at least one shutdown unit.

In one or more embodiments, the evaluation unit is coupled to the TXD interface to receive the TXD digital transmit signal, wherein the evaluation unit is configured to observe whether a dominant bit represented by the TXD transmit signal is also represented as a dominant bit by the BUS signal, wherein the evaluation unit is configured to trigger a positive detection of a transmission error if the result of the observation indicates that the dominant bit represented by the digital TXD transmission signal is not represented by the BUS signal.

In one or more embodiments, the evaluation unit is configured to generate the control signal in response to a positive detection of the transmission error.

In one or more embodiments, the transceiver is configured to transmit an error signal to the CAN controller via a further interface of the transceiver in response to a detected error sequence or a detected transmission error.

In accordance with a second aspect of the present disclosure, a method for a Controller Area Network, CAN, transceiver is provided, wherein the CAN transceiver comprising a CAN BUS interface, a transmit data, TXD, interface, a receive data, RXD, interface, a receiver coupled to the CAN BUS interface and RXD interface, and a transmitter coupled to the TXD interface and the CAN BUS interface, and wherein the method comprises the steps of:

a) receiving a digital TXD transmit signal representing a frame comprising a plurality of bits via the TXD interface from a CAN controller, b) generating a BUS signal representing the bits of the frame in a sequence at the CAN BUS interface, c) measuring an electrical current of the transmitter, referred to as a transmitter current, d) detecting each dominant bit represented by the BUS signal based on the transmitter current, e) detecting an error sequence of at least six successive dominant bits detected based on the transmitter current, and f) generating a control signal in response to a detected error sequence, wherein the control signal represents a fault of the transmitter.

In accordance with a third aspect of the present disclosure, a CAN system is provided, wherein the CAN system comprising a CAN controller and a CAN transceiver according to the first aspect or one of the previous embodiments of the CAN transceiver, wherein the CAN controller is connected via respective signal connections to the TXD interface of the transceiver and to the RXD interface of the transceiver.

In accordance with fourth aspect of the present disclosure, a computer program is provided, comprising executable instructions which, when executed by a processing unit, cause the processing unit being configured to carry out the method of the second.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DESCRIPTION OF EMBODIMENTS

Figure 1:
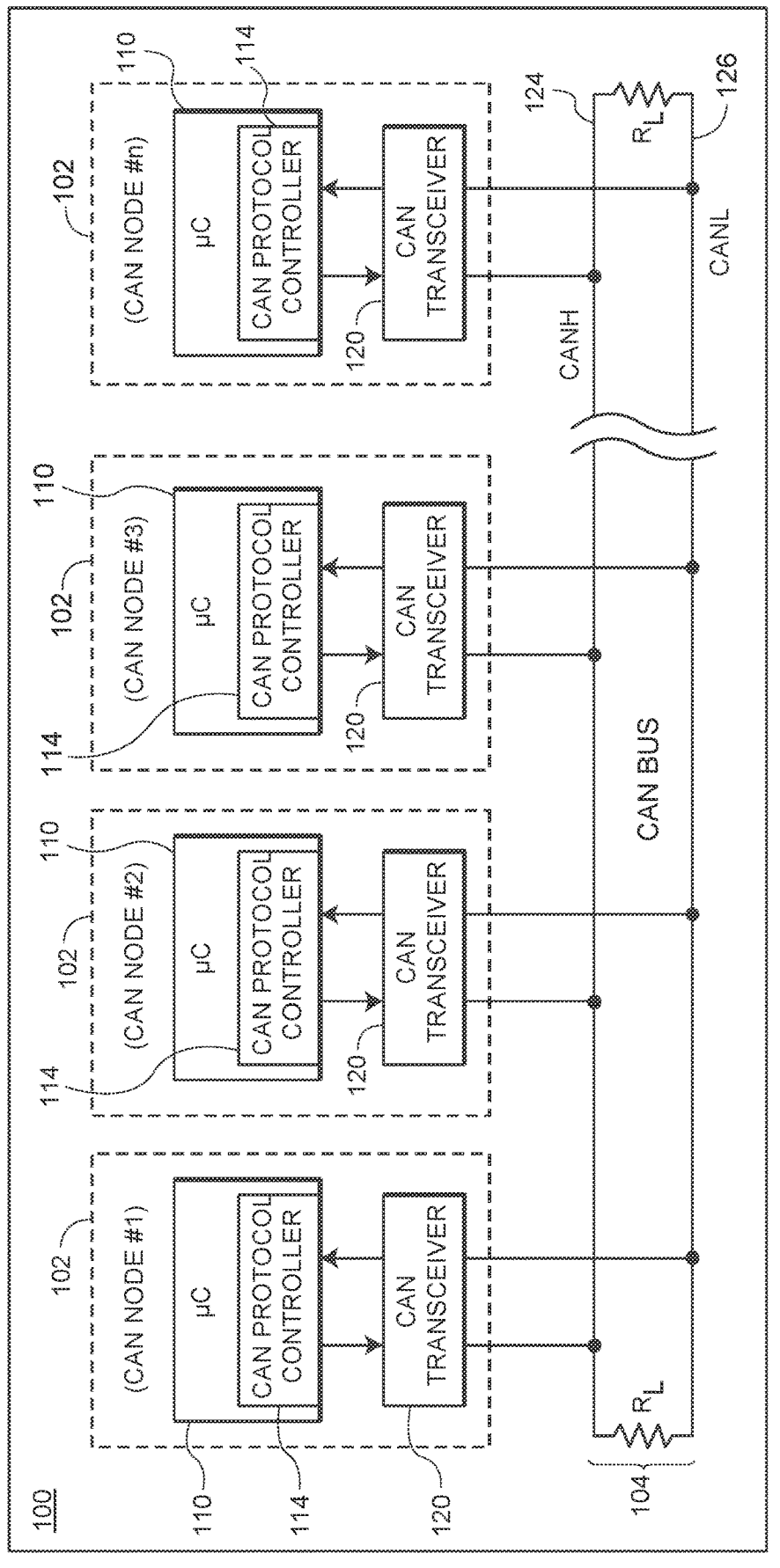
FIG. 1 shows a simplified diagram of CAN network.

FIG. 1 depicts a CAN network 100 that includes multiple CAN nodes 102, also referred to as "ECUs," each connected to a CAN bus 104. In the embodiment of FIG. 1, each CAN node 102 includes a microcontroller 110 having an embedded CAN protocol controller 114 and a CAN transceiver 120. The CAN protocol controller 114 may be referred to as a controller or CAN controller. The CAN transceiver 120 may be referred to as a transceiver.

The microcontrollers 110 are typically connected to at least one device (not shown) such as a sensor, an actuator, or some other control device and are programmed to determine the meaning of received messages and to generate appropriate outgoing messages. The microcontrollers 110, which may also be referred to as host processors, hosts or digital signal processors (DSPs), are known in the field. In an embodiment, the host supports application software that interacts with the CAN protocol controller 114.

The CAN bus 104 carries analog differential signals and includes a first CAN signal line 124, which is also referred to as the CAN high (CANH) bus line 124, and a second CAN signal line 126, which is also referred to as the CAN low (CANL) bus line 126. The CAN bus 104 is known in the field.

Figure 2:
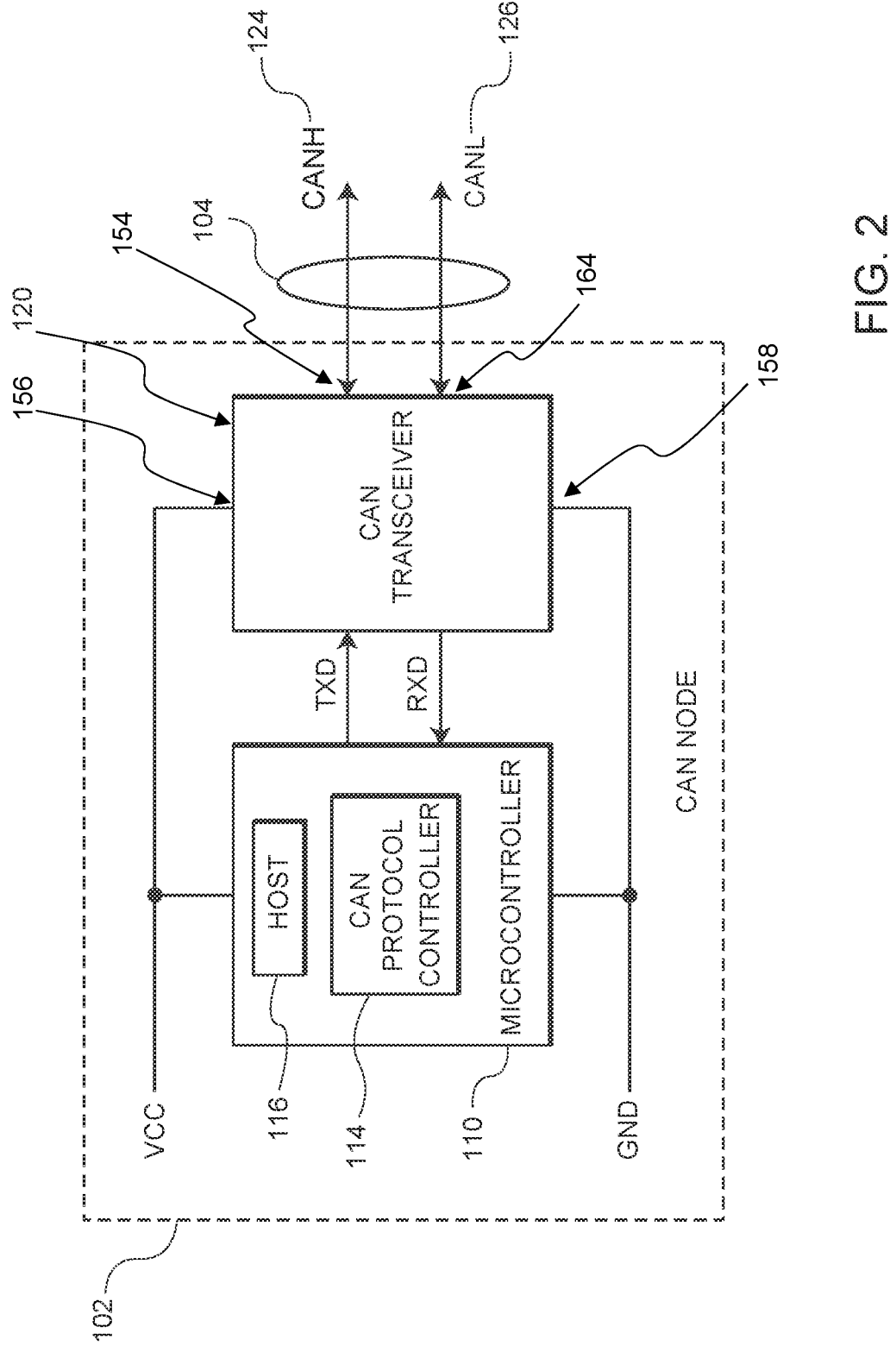
FIG. 2 shows a simplified block diagram of CAN node.

FIG. 2 depicts an expanded view of one CAN node 102 from FIG. 1. In the expanded view of FIG. 2, the microcontroller 110 includes a host 116, which may be, for example, a software application that is stored in a memory of the microcontroller 110 and executed by processing circuits of the microcontroller 110. The microcontroller 110 and the CAN transceiver 120 of the CAN node 102 are connected between a first supply voltage, VCC, and as second supply voltage, which is usually ground, GND. For the purpose of the voltage supply, the CAN transceiver 120 may comprise a first supply terminal 156, that can be connected to the first supply voltage, and a second supply terminal 158, that can be connected to second supply voltage. The analogous terminals may be provided by the microcontroller 110 or may be even combined with the respective terminals of the microcontroller 110. As illustrated in FIG. 2, data communicated from CAN protocol controller 114 being implemented by the microcontroller 110 to the CAN transceiver 120 is identified as transmit data (TXD) and data communicated from the CAN transceiver 120 to the CAN protocol controller 114 being implemented by the microcontroller 110 is referred to as receive data (RXD). Throughout the description, TXD is carried on a TXD path and RXD is carried on an RXD path. Data is communicated to and from the CAN bus 104 via the CANH and CANL bus lines 124 and 126, respectively.

The CAN protocol controller 114 is preferably embedded within the microcontroller 110, but may also be implemented external to the microcontroller 110 (e.g., a separate IC device). The data link layer operations between the CAN protocol controller 114 and the CAN transceiver 120 is known in the field.

For example, in receive operations, the CAN protocol controller 114 receives from the transceiver 120 serial bits in a bit stream, referred to as a RXD stream, via the RXD path. The CAN protocol controller 114 may store the received bits until an entire message is available for fetching by the microcontroller 110. The CAN protocol controller 114 can also decode the CAN message according to the standardized frame format of the CAN protocol.

In transmit operations, the CAN protocol controller 114 receives a message from the microcontroller 110 and transmits the message as serial bits in a bit stream, referred to as a TXD stream, via the TXD path in the CAN frame format to the CAN transceiver 120, such that the transceiver receives frames, with each frame comprising several bits.

The CAN transceiver 120 is located between the CAN controller 114 being implemented by the microcontrollers 110 and the CAN bus 104. The CAN transceiver 120 is configured to implement physical layer operations as known in the field.

For example, in receive operations, a CAN transceiver 120 converts analog differential signals from the CAN bus 104 to the RXD stream of serial bits that the CAN protocol controller 114 can interpret. The CAN transceiver 120 may also protects the CAN protocol controller 114 from extreme electrical conditions on the CAN bus 104, e.g., electrical surges.

In transmit operations, the CAN transceiver 120 can convert the bits of the frames of the TXD stream received via the TXD path from the CAN protocol controller 114 into analog differential signals that are sent on the CAN bus 104.

As noted above, the CAN protocol controller 114 can be configured to support the normal mode or the flexible data rate mode. As used herein, "CAN normal mode" (also referred to as "CLASSICAL CAN mode") as well as "CAN FD mode" refer to frames that are formatted according to the ISO 11898-1 standard.

Figure 3:
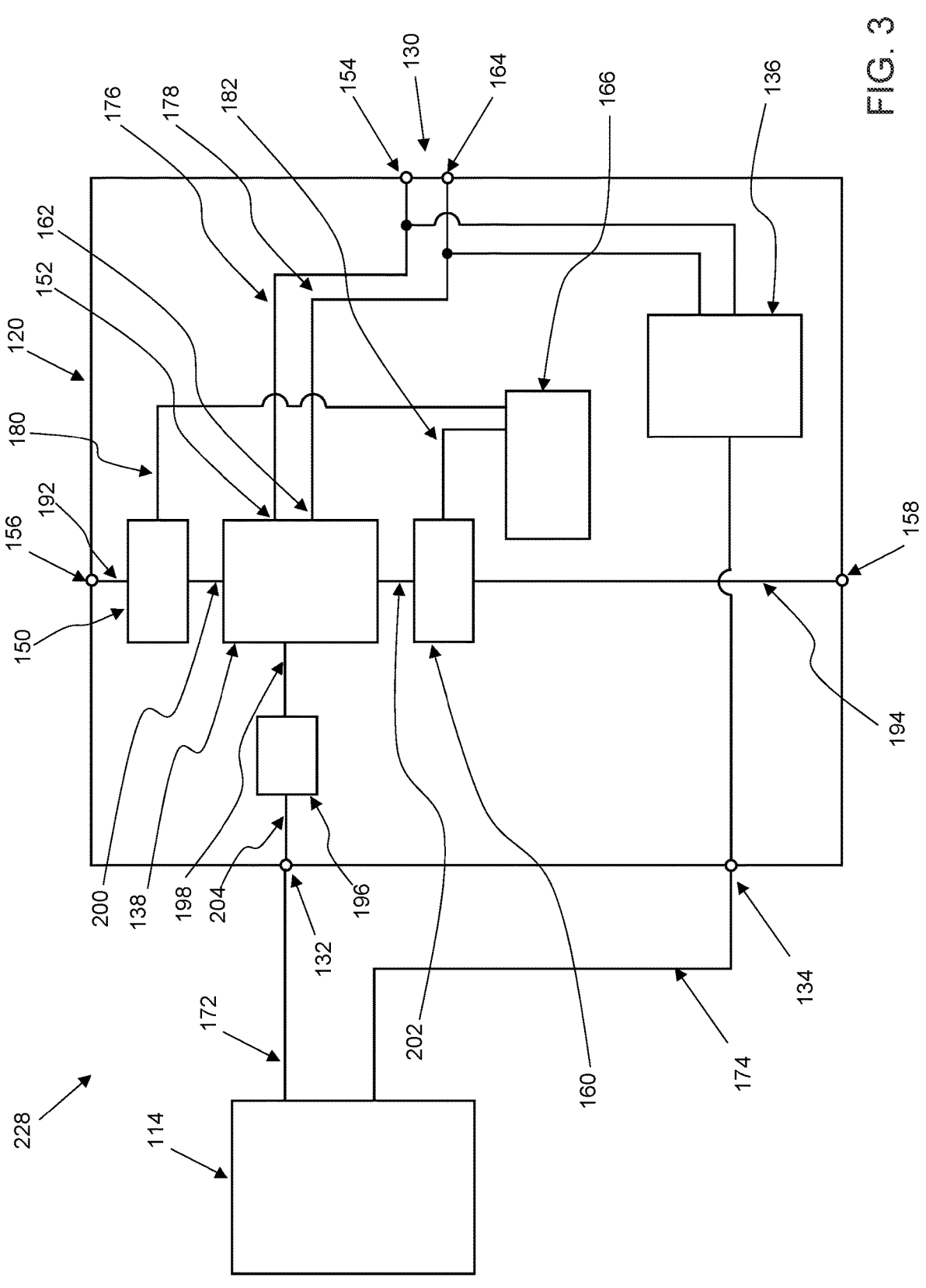
FIGS. 3 to 8 each shows an embodiment of a CAN transceiver.

FIG. 3 schematically illustrates an embodiment of the CAN transceiver 120 according to the present disclosure.

The CAN transceiver 120 comprises a CAN BUS interface 130, a TXD interface 132, an RXD interface 134, a receiver 136, and a transmitter 138. The receiver 136 may be formed as a physical unit of the transceiver 120 and/or at least partially as a logical unit of the transceiver 120. The transmitter 138 may be formed as a physical unit of the transceiver 120 and/or at least partially as a logical unit of the transceiver 120.

The receiver 136 is coupled between the CAN BUS interface 130 and the RXD interface 134. Preferably, the receiver 136 is directly coupled to both the CAN BUS interface 130 and the RXD interface 134. The transmitter 138 is coupled between the TXD interface 132 and the CAN BUS interface 130. Preferably, the transmitter 138 is directly coupled to both the TXD interface 132 and the CAN BUS interface 130. In an example, the transmitter 138 is connected to the TXD interface 132 via a signal connection. In an example, as shown for example in FIG. 3, the transmitter 138 is connected to the TXD interface 132 via a signal connection 204, a TXD signal error detector 196, and a signal connection 198.

The transceiver 120 is configured to receive a digital TXD transmit signal via the TXD interface 132. The TXD transmit signal may also be referred to as the TXD signal. The TXD transmit signal may be transmitted from a CAN controller 114 to the TXD interface 132 via a signal connection 172. The TXD signal represents at least one frame. Each frame comprising a plurality of digital bits.

As can be seen schematically from FIG. 3, the TXD transmit signal can reach the TXD signal error detector 196 via the TXD interface 132 and the signal connection 204. In an example, the TXD signal error detector 194 is configured to detect a sequence of at least six consecutive identical bits in the TXD transmit signal as a TXD error. Further, the TXD signal error detector 196 may be configured to stop forwarding the TXD transmit signal to the signal connection 198 upon detection of the TXD error. The TXD signal error detector 196 may further be configured to forward the TXD transmit signal from the signal connection 204 to the signal connection 198 if the TXD signal error detector 196 does not detect a TXD error. In an example, the TXD signal error detector 196 may detect the TXD error based on a timeout of at least six consecutive equal bits. Therefore, in an example, the TXD signal error detector 196 may be configured as a timeout detector.

As can also be seen schematically from FIG. 3, a frame represented by the TXD transmit signal may reach the transmitter 138 via the TXD interface 132. The transmitter 138 is configured to generate a CAN BUS signal at the CAN BUS interface 130. The CAN BUS signal may be generated as a differential voltage signal between a first terminal 154 of the CAN BUS interface 130 and a second terminal 164 of the CAN BUS interface 130. In an example, a differential voltage of 0 V may represent a recessive bit "1" and a differential voltage of 2 V may represent a dominant bit "0". The CAN BUS signal may represent the bits of the frame in a sequence.

The transceiver 120 is configured to measure an electrical current of the transmitter 138. This electrical current is also referred to as the transmitter current. In an example, to transmit a dominant bit "0" over the CAN BUS 104, the transmitter 138 may generate the aforementioned differential voltage of 2 V between the two terminals 154, 156 such that a first actuation current flows over the signal connection 176 between the terminal 154 of the CAN BUS interface 130 and the transmitter 138 and a second actuation current flows over the signal connection 178 between the terminal 164 of the CAN BUS interface 31 and the transmitter 138. The first and second actuation currents may flow in reverse directions. To effect these electrical currents, it may further be necessary for a first supply current to flow from the first supply terminal 156 of the transceiver 120 to the transmitter 138 and a second supply current to flow from the second supply terminal 158 of the transceiver 120 to the transmitter 138. The first and second supply currents may flow in reverse directions. Said currents are significantly higher if a dominant bit is generated at the CAN BUS interface 130 instead of a recessive bit. Therefore, based on at least one of said electrical currents flowing into or out of the transmitter 138, it is derivable from at least one of the currents whether the transmitter 138 generates a dominant bit at the CAN BUS interface 130 or whether the transmitter does not generate a dominant bit, but preferably a recessive bit, at the CAN BUS interface 130.

The transceiver 120 is configured to detect each dominant bit that is represented by the CAN BUS signal caused by the transmitter 138 based on the measured transmitter current. In an example, the transmitter current may be formed by at least one of the previously mentioned currents. Therefore, for a dominant bit, the transmitter current will be higher than for a recessive bit. The transceiver 120 may be configured to detect such a higher current and thereby detect a corresponding dominant bit.

The transceiver 120 is further configured to detect an error sequence of at least six consecutive dominant bits, each detected based on the transmitter current. In an example, if CAN BUS signal representing a plurality of bits in a sequence is generated at CAN BUS interface 130 by means of transmitter 138, where transceiver 120 is configured to detect each dominant bit in said sequence based on the transmitter current, transceiver 120 may detect multiple consecutive dominant bits in the bit sequence. The transceiver 120 is further configured to detect the error sequence of at least six consecutive dominant bits in the bit sequence, if such an error sequence exists. The error sequence of at least six consecutive dominant bits corresponds to a break of the rules according to the CAN standard referred to in the introduction. Therefore, the error sequence of at least six consecutive dominant bits indicates that there is a fault in the transmitter 138.

The transceiver 120 is configured to generate a control signal representing a fault of the transmitter 138 in response to a detected error sequence (of at least six consecutive dominant bits). The transceiver 120 may be configured to send and/or use the control signal to initiate follow-up actions. For example, based on the control signal, disabling the transmitter 138, the transceiver 120 and/or notifying the CAN controller 114 of the detected fault. Using the control signal, security of the transceiver 120, the CAN controller 114, the CAN network 104, and/or the nodes 102 connected to the CAN network 104 may be improved.

As previously discussed, the TXD signal error detector 196 may be used to detect a TXD error in the TXD transmit signal. If a TXD error is detected by the TXD signal error detector 196, the TXD signal error detector 196 may prevent the TXD transmit signal from being forwarded to the transmitter 138. Thus, if the TXD transmit signal has a TXD error with at least six consecutive dominant bits, the TXD signal error detector 196 may effectively prevent the transmitter 138 from generating a CAN BUS signal at the CAN BUS 130 representing the TXD error.

However, the TXD signal error detector 196 is not adapted to prevent or detect a fault of the transmitter 138.

In an example, if the transmitter 138 exhibits a fault causing the transmitter 138 to generate a CAN BUS signal at the CAN BUS interface 130 representing an error sequence of at least six consecutive dominant bits, this fault of the transmitter 138 will be detected by the previously explained embodiment of the transceiver 120 and based on the transmitter current. The transceiver 120 is further configured to generate a control signal representing the detected fault of the transmitter 138. In an example, the transceiver 120 may use the control signal to disable the faulty transmitter 138. Alternatively or additionally, the CAN transceiver 120 may send the control signal to a CAN controller 114 to communicate the fault of the transmitter 138. The CAN controller 114 may then initiate follow-up actions.

The transceiver 120 is preferably configured to detect a fault of the transmitter 138 by detecting the error sequence of at least six consecutive dominant bits represented by the CAN BUS signal. The error sequence may be detected by the transceiver 120 based on the transmitter current. Using the transmitter current to detect the error sequence has the advantage of detecting a fault of the transmitter 138 only if the error sequence is caused by the transmitter 138. In an example, if a signal is transmitted from a remote node 102 to the CAN BUS interface 130 of the transceiver 120 via the CAN BUS 104, where the signal represents a sequence of at least six consecutive dominant bits, these dominant bits will cause a transmitter current in the transmitter 138 with no current, or at most a low current, but not representative of dominant bits generated by the transmitter 138 itself. Therefore, the transceiver 120 will not detect the at least six consecutive dominant bits received as an error sequence based on the transmitter current. Rather, the transceiver 120 is preferably configured to detect an error sequence of at least six consecutive dominant bits based on the transmitter current only if those bits are self-generated by the transmitter 138. Detection of the potential fault of the transmitter 138 in response to a detected error sequence is therefore particularly robust to potential interference with and/or errors from remote CAN nodes 102.

In an example, the transceiver 120 comprises a first sensor unit 150. The first sensor unit 150 is preferably arranged and/or configured to measure a first current to power the transmitter 138. The first current may also be referred to as a first supply current. The first current may form at least a part of the transmitter current of the transmitter 138. In an example, the transmitter current is formed by the first current. The first current is an electrical current. In an example, the transmitter 138 may comprise a first driver circuit. The first driver circuit may have a current demand that increases if a dominant bit is generated at the CAN BUS interface 130 by means of the transmitter 138. The increased current demand if the dominant bit is generated at the CAN BUS interface 130 will therefore be reflected in the value of the first current to supply the transmitter 138. The first current measured by means of the first sensor unit 150 may therefore be used to detect whether a dominant bit is generated at the CAN BUS interface 130 by means of the transmitter 138 or whether no dominant bit, thus in particular a recessive bit, is generated at the CAN BUS interface 130 by the transmitter 138. In an example, the transceiver 120 may be configured to detect any dominant bit represented by the CAN BUS signal generated by the transmitter 138 based on the first current.

In an example, the transceiver 120 comprises a first supply terminal 156 and a second supply terminal 158 for supplying electrical power to the transceiver 120. As schematically illustrated in an example shown in FIG. 3, the first sensor unit 150 may be coupled between the first supply terminal 156 and the transmitter 138. A first current flowing through the first supply terminal 156 to the transmitter 138 may be measured by the first sensor unit 150. The signal connection 192 may extend from the first supply terminal 156 to the first sensor unit 150. Another signal connection 200 may extend from the sensor unit 150 to the transmitter 138. In an example, the first current may flow from the first supply terminal 158 via the signal connection 192 to the first sensor unit 150 and from the first sensor unit 150 via the signal connection 200 to the transmitter 138. The preferred arrangement of the first sensor unit 150 between the first supply terminal 156 and the transmitter 138 can ensure that the first current measured by the first sensor unit 150 is caused solely by the transmitter 138. Therefore, the first current measurable by the first sensor unit 150 can be advantageously used by the transceiver 120 to detect whether the CAN BUS signal generated by the transmitter 138 represents a dominant bit. The detection is thereby particularly robust to possible bits sent to the transceiver 120 by means of a signal over the CAN BUS 104 from a remote node 102.

In an example, in particular as shown schematically in FIG. 3, the first sensor unit 150 is physically separate from the transmitter 138. For example, the first sensor unit 150 may be physically separated from the transmitter 138 by the signal connection 200. In another example, which is not shown, the first sensor unit 150 may be partially or fully integrally formed with the transmitter 138.

In an example, the transceiver 120 comprises a second sensor unit 160. The second sensor unit 160 is preferably arranged and/or configured to measure a second current to power the transmitter 138. The second current is an electrical current. The second current may also be referred to as a second supply current. The second current may form at least a part of the transmitter current of the transmitter 138. In an example, the transmitter current is formed by the second current. In an example, the transmitter 138 may comprise a second driver circuit. The second driver circuit may have a current demand that increases if a dominant bit is generated at the CAN BUS interface 130 by means of the transmitter 138. The increased current demand if the dominant bit is generated at the CAN BUS interface 130 will therefore be reflected in the value of the second current used to power the transmitter 138. The second current measured by means of the second sensor unit may therefore be used to detect whether a dominant bit is generated at the CAN BUS interface 130 by means of the transmitter 138 or whether no dominant bit, thus in particular a recessive bit, is generated at the CAN BUS interface 130. In an example, the transceiver 120 may be configured to detect any dominant bit represented by the CAN BUS signal generated by the transmitter 138 based on the second current.

In an example, the transceiver 120 comprises a first supply terminal 156 and a second supply terminal 158 for supplying electrical power to the transceiver 120. As schematically illustrated in an example shown in FIG. 3, the second sensor unit 160 may be coupled between the second supply terminal 158 and the transmitter 138. A second current flowing through the second supply terminal 158 to the transmitter 138 may be measured by the second sensor unit 160. The signal connection 194 may extend from the second supply terminal 158 to the second sensor unit 160. Another signal connection 202 may extend from the second sensor unit 160 to the transmitter 138. In an example, the second current may flow from the second supply terminal 158 to the second sensor unit 160 via the signal connection 194 and from the second sensor unit 160 to the transmitter 138 via the signal connection 202. The preferred arrangement of the second sensor unit 160 between the second supply terminal 158 and the transmitter 138 can ensure that the second current measured by the second sensor unit 160 is caused solely by the transmitter 138. The second current measurable by the second sensor unit 160 may therefore be advantageously used by the transceiver 120 to detect whether the CAN BUS signal generated by the transmitter 138 represents a dominant bit. In this regard, the detection is particularly robust to possible bits sent to the transceiver 120 by means of a signal over the CAN BUS 104 from a remote node 102.

In an example, such as that shown schematically in FIG. 3, the second sensor unit 160 is physically separate from the transmitter 138. For example, the second sensor unit 160 may be physically separated from the transmitter 138 by the signal connection 202. In another example, not shown, the second sensor unit 160 may be partially or fully integrally formed with the transmitter 138.

In an example, the first supply terminal 156 of the transceiver 120 is supplied with a first supply voltage, VCC. In addition, the second supply terminal 158 of the transceiver 120 may be supplied with a second supply voltage, in particular ground potential, Ground. If a CAN BUS signal representing a dominant bit is generated by the transmitter 138, the absolute value of the first current measured by the first sensor unit 150 may correspond to the absolute value of the second current measured by the second sensor unit. It may therefore be sufficient, in an example, for the transmitter current to be formed by either the first current or, alternatively, the second current.

In an example, the transceiver 120 is configured to detect each dominant bit represented by the CAN BUS signal generated by the transmitter 138 based on the first current and the second current. Thus, to detect the dominant bit, both the first current and the second current may be considered by the transceiver 120. Thus, the detection may be robust to electromagnetic interference.

In an example, the transceiver 120 comprises an evaluation unit 166. The evaluation unit 166 is coupled to at least one sensor unit 150, 160 of the two sensor units 150, 160. In an example, the evaluation unit 166 may be coupled to the first sensor unit 150 via a signal connection 180. In an example, the evaluation unit 166 may be coupled to the second sensor unit 160 via another signal connection 182. The evaluation unit 166 may be connected to only one of the two sensor units 150, 160 or to both sensor units 150, 160. Each sensor unit 150, 160 connected to the evaluation unit 166 may transmit a sensor signal to the evaluation unit 166.

In an example, the first sensor unit 150 may transmit a first sensor signal representing the first current to the evaluation unit 166 via the signal connection 180. The evaluation unit 166 may be configured to compare the value of the first current to a predefined first current threshold. Further, the evaluation unit 166 may be configured to trigger a positive detection of a dominant bit represented by the CAN BUS signal generated by the transmitter 138 if the result of the comparison indicates that the value of the first current is higher than the first current threshold value. In an example, the evaluation unit 166 may be configured to not trigger a positive detection of a dominant bit (thus not represented by the CAN BUS signal generated by the transmitter 138) if the result of the comparison indicates that the value of the first current is less than the first current threshold.

In another example, the second sensor unit 160 may transmit a second sensor signal representing the second current to the evaluation unit 166 via the further signal connection 182. The evaluation unit 166 may be configured to compare the value of the second current to a predefined second current threshold value. Further, the evaluation unit 166 may be configured to trigger a positive detection of a dominant bit represented by the CAN BUS signal generated by the transmitter 138 if the result of the comparison indicates that the value of the second current is higher than the second current threshold value. In an example, the evaluation unit 166 may be configured to not trigger a positive detection of a dominant bit (thus not represented by the CAN BUS signal generated by the transmitter 138) if the result of the comparison indicates that the value of the second current is less than the second current threshold.

In another example, the evaluation unit 166 may be configured to trigger a positive detection of a dominant bit represented by the CAN BUS signal generated by the transmitter 138 if the result of the comparisons indicates that both the value of the first current is higher than the first current threshold and the value of the second current is higher than the second current threshold. In another example, the evaluation unit 166 may be configured not to trigger a positive detection of a dominant bit (thus not represented by the CAN BUS signal generated by the transmitter 138) if the result of the comparisons indicates that the value of the first current is less than the first current threshold and/or the value of the second current is less than the second current threshold.

The CAN BUS signal generated by the transmitter 138 is preferably a differential voltage signal. To represent a dominant bit via the CAN BUS signal, in an example, a voltage swing of 2 V is required. To produce this voltage swing of 2 V, increased currents flow between the transmitter 138 and the two terminals 154, 164 of the CAN BUS interface 130 is required. Therefore, to produce the voltage swing of 2 V, the transmitter 138 requires increased electrical power consumption, so that a higher first current and a higher second current will also flow. To represent a recessive bit via the CAN BUS signal, in an example, no or almost no voltage swing is required, so that no currents or at most very low currents flow between the transmitter 138 and the two terminals 154, 164 of the CAN BUS interface 130. Therefore, for the recessive bit, the transmitter 138 requires no or at most very low electrical power consumption, so that no or at most a very low first current and also no or at most a very low second current will flow.

In an example, the first current threshold value may be defined such that the value of the first current is higher than the first current threshold value if the CAN BUS signal generated by the transmitter 138 represents a dominant bit. In an example, the first current threshold value may be defined such that the value of the first current is lower than the first current threshold value if the CAN BUS signal generated by the transmitter 138 represents a recessive bit. In an example, the second current threshold value may be defined such that the value of the second current is higher than second current threshold value if the bus signal generated by the transmitter 138 represents a dominant bit. In an example, the second current threshold value may be defined such that the value of the second current is lower than the second current threshold value if the CAN BUS signal generated by the transmitter 138 represents a recessive bit. Said values of the first and second currents preferably refer to the respective absolute values.

The evaluation unit 166 provides the advantage of being able to detect a dominant bit represented by a CAN BUS signal generated by the transmitter 138 based on a comparison of the transmitter current, such as the first current, with a predefined threshold value for the current that would have to flow into or out of the transmitter 138 at a minimum to represent said dominant bit via the CAN BUS signal. In an example, the threshold value may be understood as a minimum value for the absolute value of transmitter current above which it is robustly detectable that a dominant bit is being transmitted via the CAN BUS signal generated by the transmitter 138. As a result, the evaluation unit 166 may detect the dominant bit based on an excess of the (absolute value) of the transmitter current drawn and/or caused by the transmitter 138 above the threshold value.

In an example, the evaluation unit 166 of the transceiver 120 may be configured to detect each dominant bit represented by the CAN BUS signal generated by the transmitter 138 based on the transmitter current, preferably formed by the first current and/or second current.

As previously explained, increased currents flow across the signal connections 176, 178 if a CAN BUS signal representing a dominant bit is generated by the transmitter 138. The increased currents are generated and/or caused by the transmitter 138. In an example, the transmitter current of the transmitter 138 may be formed by the current between the transmitter 138 and the first terminal 154 of the CAN BUS interface 130 and/or the current between the transmitter 138 and the second terminal 164 of the CAN BUS interface 130.

Figure 4:
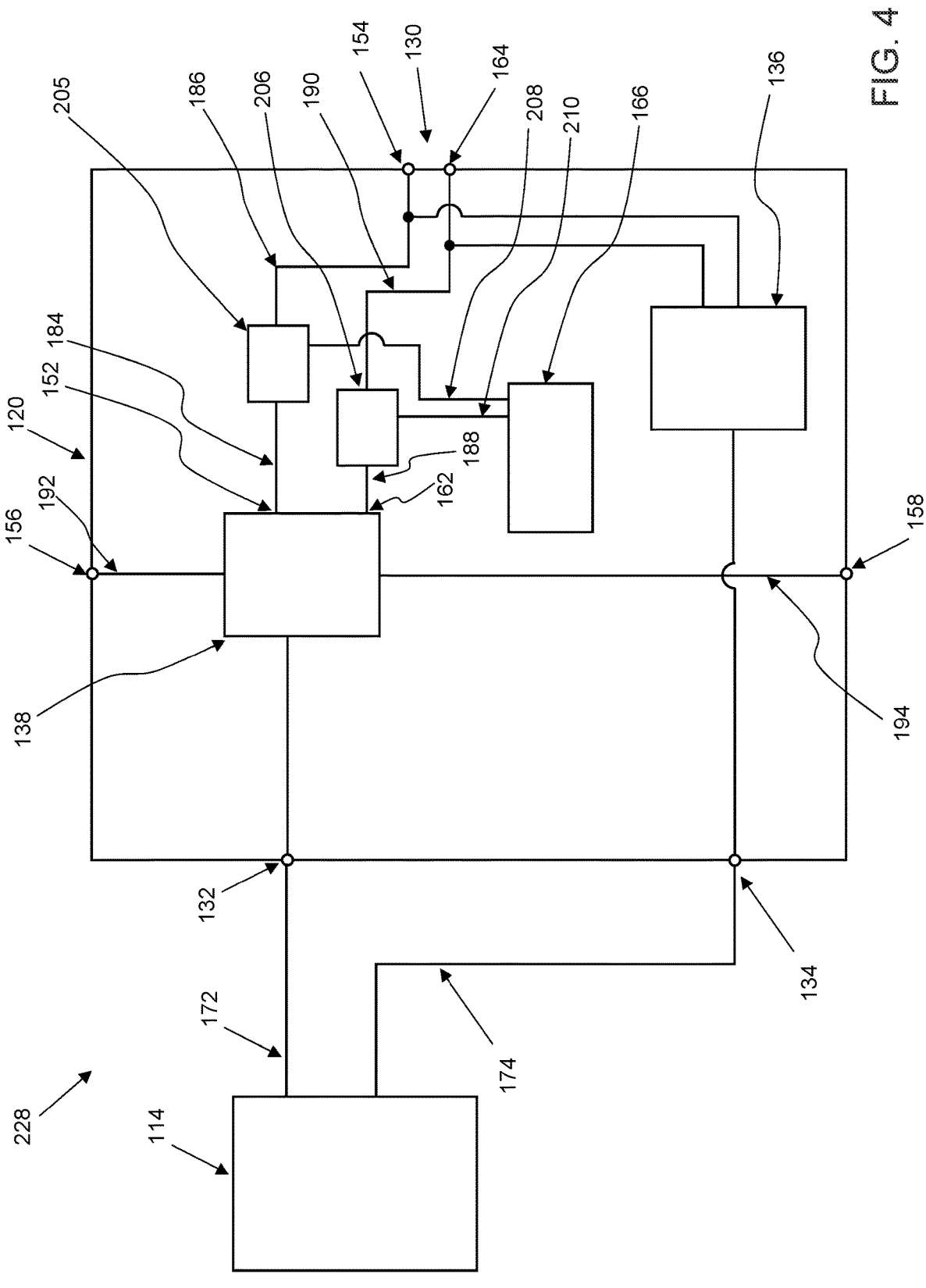

FIG. 4 schematically illustrates an example of a further embodiment of the CAN transceiver 120. In this embodiment, the CAN transceiver 120 does not comprise the first sensor unit 150 or the second sensor unit 160. However, it should be noted that in an example, the CAN transceiver 120 may additionally be equipped with the first sensor unit 150 and/or the second sensor unit 160. If the CAN transceiver 120 is additionally equipped with the first sensor 150 and/or the second sensor 160, reference is made to the preceding explanations, preferred features, advantages and/or technical effects provided in connection with FIG. 3 in an analogous manner.

The design of the CAN transceiver 120 of FIG. 4 corresponds in many details to the design of the CAN transceiver 120 of FIG. 3, so that reference for these details to the preceding explanations, preferred features, advantages and/or technical effects provided in connection with FIG. 3 in an analogous manner.

In an example, the transceiver 120 comprises a third sensor unit 205. The third sensor unit 205 is preferably arranged and/or configured to measure a third current between the transmitter 138 and the first terminal 154 of the CAN BUS interface 130. The third current may also be referred to as a third actuation current. The third current may form at least a part of the transmitter current of the transmitter 138. In an example, the third sensor unit 205 is coupled between a first output 152 of the transmitter 138 and the first terminal 154 of the CAN BUS interface 130. The CAN transceiver 120 may comprise a signal connection 184 extending from the first output 152 of the transmitter 138 to the third sensor unit 205. Further, the CAN transceiver 120 may comprise another signal connection 186 extending from the third sensor unit 205 to the first terminal 154 of the CAN BUS interface 130. The signal connection 184, the third sensor unit 205, and the signal connection 186 may be connected in series to provide a connection between the first output 152 of the transmitter 138 and the first terminal 154 of the CAN BUS interface 130.

In an example, the transceiver 120 comprises a fourth sensor unit 206. The fourth sensor unit 206 is preferably arranged and/or configured to measure a fourth current between the transmitter 138 and the second terminal 164 of the CAN BUS interface 130. The fourth current may also be referred to as a fourth actuation current. The fourth current may form at least a part of the transmitter current of the transmitter 138. In an example, the fourth sensor is coupled between a second output 162 of the transmitter 138 and the second terminal 164 of the CAN BUS interface 130. The CAN transceiver 120 may comprise a signal connection 188 extending from the first output 162 of the transmitter 138 to the fourth sensor unit 206. Further, the CAN transceiver 120 may comprise another signal connection 190 extending from the fourth sensor unit 206 to the second terminal 164 of the CAN BUS interface 130. The signal connection 188, the fourth sensor unit 206, and the signal connection 190 may be connected in series to provide a connection between the second output 162 of the transmitter 138 and the second terminal 164 of the CAN BUS interface 130.

In an example, the transceiver 120 comprises the evaluation unit 166. The evaluation unit 166 may be coupled to at least one sensor unit 205, 206 of the first and second sensor units 205, 206. Furthermore, in another example, the evaluation unit 166 may be coupled to at least one sensor unit 150, 160 of the first and second sensor units 150, 160, although this example will not be further explained for now. The following explanations preferably refer to the embodiment of the CAN transceiver of FIG. 4.

In an example, the evaluation unit 166 may be connected to the third sensor unit 205 via a signal connection 208. In an example, the evaluation unit 166 may be connected to the fourth sensor unit 206 via another signal connection 210. The evaluation unit 166 may be connected to one of the two sensor units 205, 206 or to both sensor units 205, 206. Each sensor unit 205, 206 connected to the evaluation unit 166 may transmit a sensor signal to the evaluation unit 166.

In an example, the third sensor unit 204 may transmit via the signal connection 208 a third sensor signal representing the third current to the evaluation unit 166. The evaluation unit 166 may be configured to compare the value of the third current to a predefined third current threshold value. Further, the evaluation unit 166 may be configured to trigger a positive detection of a dominant bit represented by the CAN BUS signal generated by the transmitter 138 if the result of the comparison indicates that the value of the third current is higher than the third current threshold value. In an example, the evaluation unit 166 may be configured to not trigger a positive detection of a dominant bit (thus not represented by the CAN BUS signal generated by the transmitter 138) if the result of the comparison indicates that the value of the third current is less than the third current threshold value.

In another example, the fourth sensor unit 206 may transmit via the further signal connection 210 a fourth sensor signal representing the fourth current to the evaluation unit 166. The evaluation unit 166 may be configured to compare the value of the fourth current to a predefined fourth current threshold value. Further, the evaluation unit 166 may be configured to trigger a positive detection of a dominant bit represented by the CAN BUS signal generated by the transmitter 138 if the result of the comparison indicates that the value of the fourth current is higher than the fourth current threshold value. In an example, the evaluation unit 166 may be configured to not trigger a positive detection of a dominant bit (thus not represented by the CAN BUS signal generated by the transmitter 138) if the result of the comparison indicates that the value of the fourth current is less than the fourth current threshold value.

In another example, the evaluation unit 166 may be configured to trigger a positive detection of a dominant bit represented by the CAN BUS signal generated by the transmitter 138 if the result of the comparisons indicates that both the value of the third current is higher than the third current threshold value and the value of the fourth current is higher than the fourth current threshold value. In another example, the evaluation unit 166 may be configured not to trigger a positive detection of a dominant bit (thus not represented by the CAN BUS signal generated by the transmitter 138) if the result of the comparisons indicates that the value of the third current is less than the third current threshold and/or if the value of the fourth current is also less than the fourth current threshold.

Furthermore, for the embodiment of the CAN transceiver 120 of FIG. 4, reference is made to the advantageous explanations, preferred features, advantages and technical effects in an analogous manner as explained for the embodiment of the CAN transceiver 120 of FIG. 3.

In an example, the transceiver 120 is configured to detect a first duration of a plurality of consecutive dominant bits. The bits are dominant bits detected based on the transmitter current generated by the transmitter 138. Preferably, the evaluation unit 166 of the transceiver 120 is configured to detect the first duration of the plurality of detected, consecutive dominant bits. In an example, the evaluation unit 166 is configured to compare the first time duration to a predefined reference time duration. Preferably, the evaluation unit 166 is configured to trigger a positive detection of the error sequence (of at least six consecutive dominant bits being detected) if the result of the comparison indicates that the first time duration is larger (longer) than the reference time duration. In an example, the time duration of each bit is approximately the same. In an example, if the evaluation unit 166 detects a first time duration that is lager (longer)

than five times the time duration of a single bit, it may be derived that the first time duration has the duration of at least six consecutive dominant bits being detected. In an example, the predefined reference duration may be understood as a threshold for the first duration to detect the error sequence of at least six consecutive dominant bits. Preferably, the error sequence is determined by at least six consecutive dominant bits because it is specified in the CAN standard that a maximum of five identical consecutive bits may be generated and/or transmitted during error-free operation. A break of this rule defined in the CAN standard leads to the conclusion that an error is present. In an example, the predefined reference duration is at least five times the time duration of a single bit and preferably less than six times the duration of a single bit. In an example, the predefined reference duration may be 5.5 times the time duration of a single bit. By choosing the lower value of the reference duration to be slightly higher than five times the duration of a single bit, very small variations in the time duration of the dominant bits can be prevented from inadvertently causing a false positive detection of the error sequence. In addition, robust detection of the error sequence can be ensured over the first duration and the predefined reference duration.

In an example, the evaluation unit 166 of the transceiver 120 is configured to generate the control signal representing a fault of the transmitter 138 in response to a detected error sequence. According to the preferred embodiment of the transceiver 120 explained previously, the error sequence is detected if a first time duration is higher than the predefined reference time duration. In this case, at least six consecutive dominant bits have represented by a CAN BUS signal been generated by the transmitter 138, such that an erroneous behavior of the transmitter 138 is present. The erroneous behavior of the transmitter 138 can also be referred to as a fault of the transmitter 138. The control signal may be configured to directly or indirectly represent the fault of the transmitter 138. In an example, the control signal may be sent from the evaluation unit 166 of the transceiver 120 to the CAN controller 114 to inform the CAN controller 114 of the fault of the transmitter 138.

Figure 5:
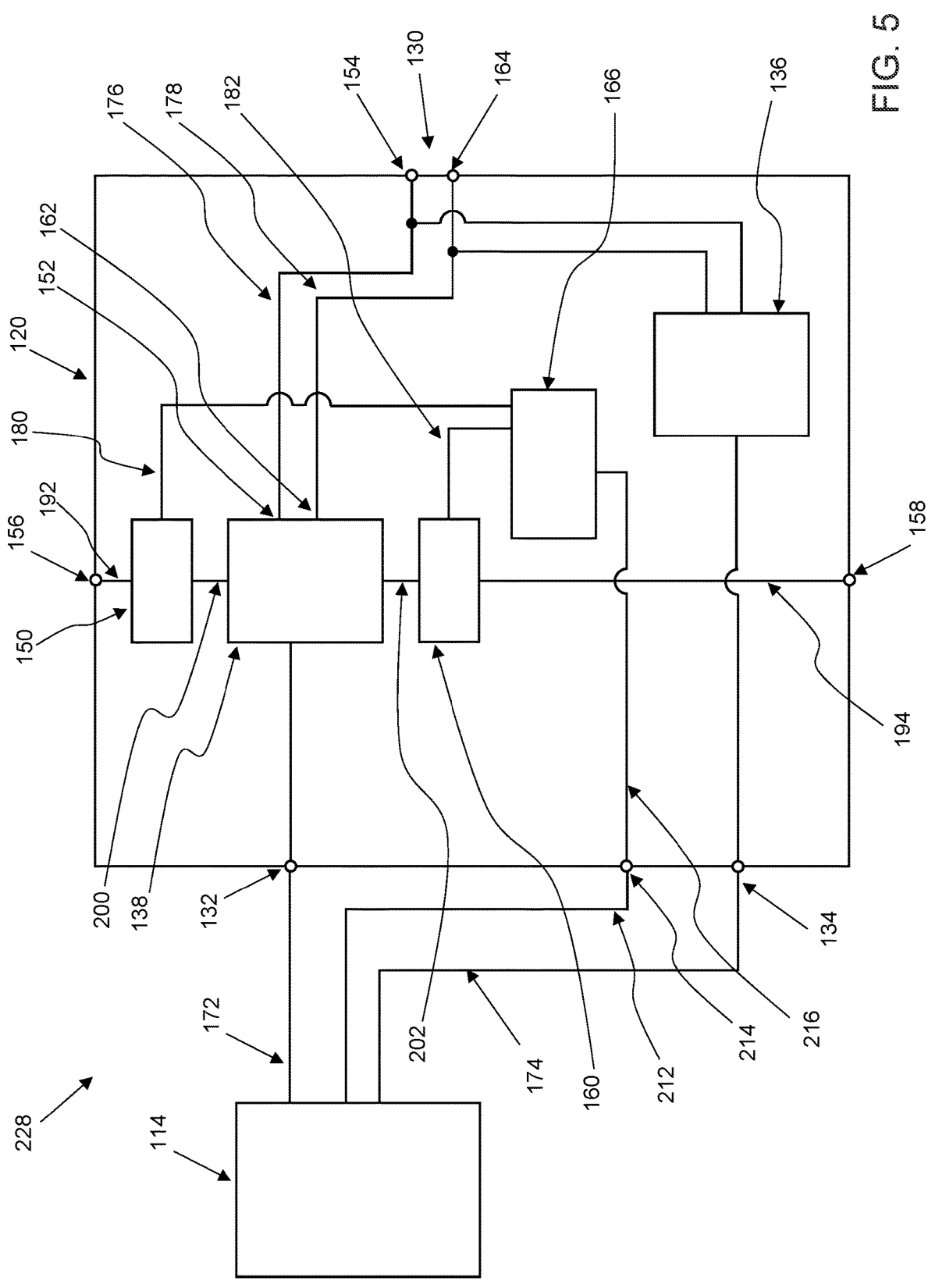

FIG. 5 schematically illustrates an example of a further embodiment of the transceiver 120, wherein the transceiver 120 is based on the embodiment of the transceiver 120 of FIG. 4 and/or FIG. 3. Therefore, for the embodiment of the transceiver 120 of FIG. 5, reference is made to the preferred explanations, preferred features, technical effects and advantages as explained for the transceiver 120 of FIG. 4 and/or FIG. 3.

In an example, the transceiver 120 comprises another signal interface 214. The transceiver 120 may further comprise a signal connection 216 extending from the evaluation unit 166 to the signal interface 214. The evaluation unit 166 is preferably configured to direct the control signal to the signal interface 214 via the signal connection 216, such that the control signal may be transmitted via the signal interface 214. In an example, the CAN controller 214 is coupled to the signal interface 214 of the transceiver 120 via another signal connection 212. In this case, the evaluation unit 166 may send the control signal to the CAN controller 114 via the signal connection 216, the signal interface 214, and the signal connection 212. As previously explained in an example, the control signal may represent the faulty state of the transmitter 138. The CAN controller 114 may be informed of the fault of the transmitter 138 of the transceiver 120 via the control signal. The CAN controller 114 may initiate follow-up actions in response to the fault of the transmitter 138. In an example, in response to the fault of the transmitter 138, the CAN controller 114 may interrupt and/or block the transmission of a TXD transmission signal to the TXD interface 132 of the transceiver and/or the reception of an RXD signal from the RXD interface 134. Alternatively or additionally, in an example, the CAN controller 114 may inform a higher-level control unit (not shown) in response to the fault of the transmitter 138.

In another example, the CAN controller 114 and the CAN transceiver 120 may be comprised by a CAN system 228.

Figure 6:
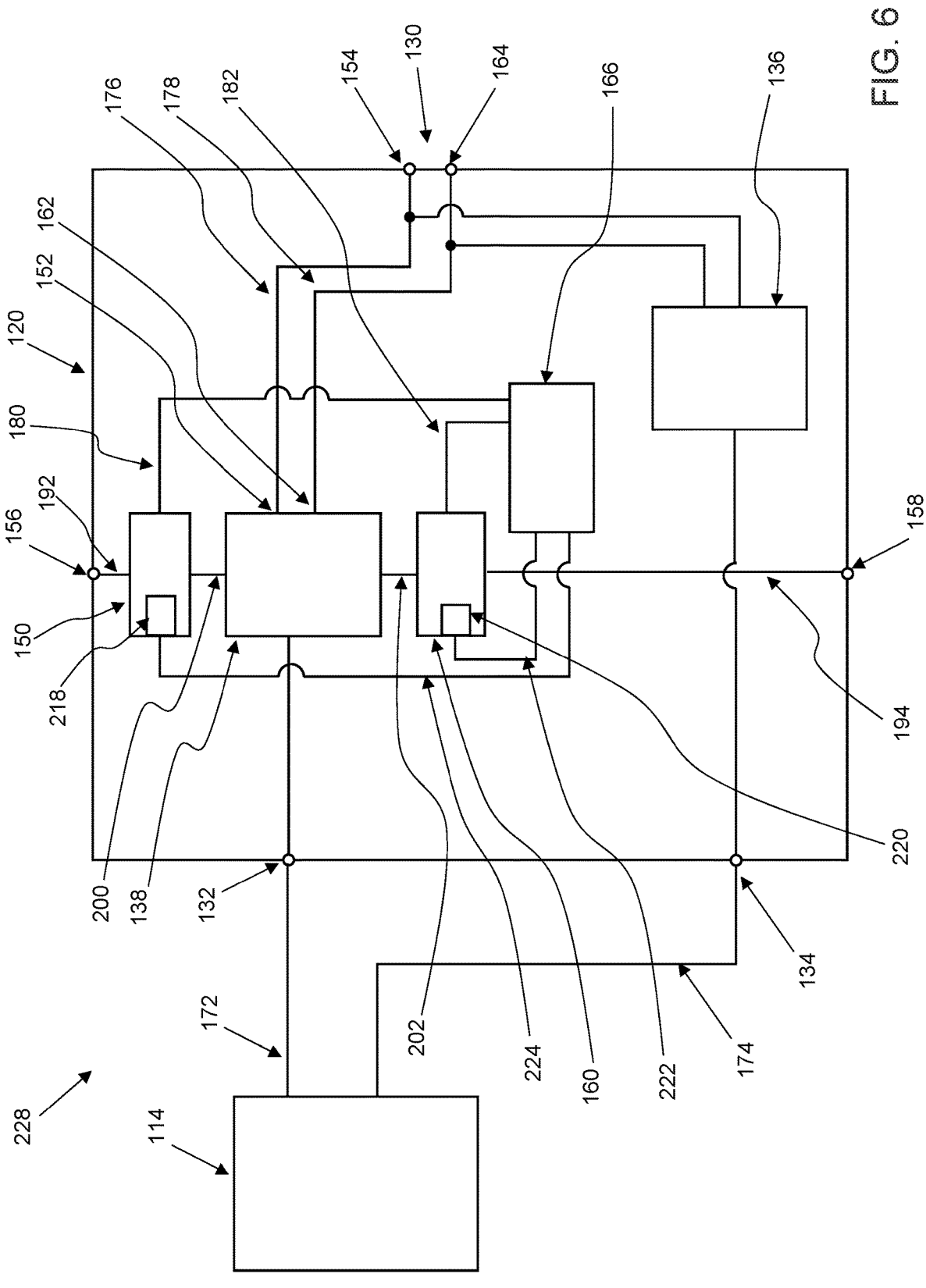
Figure 7:
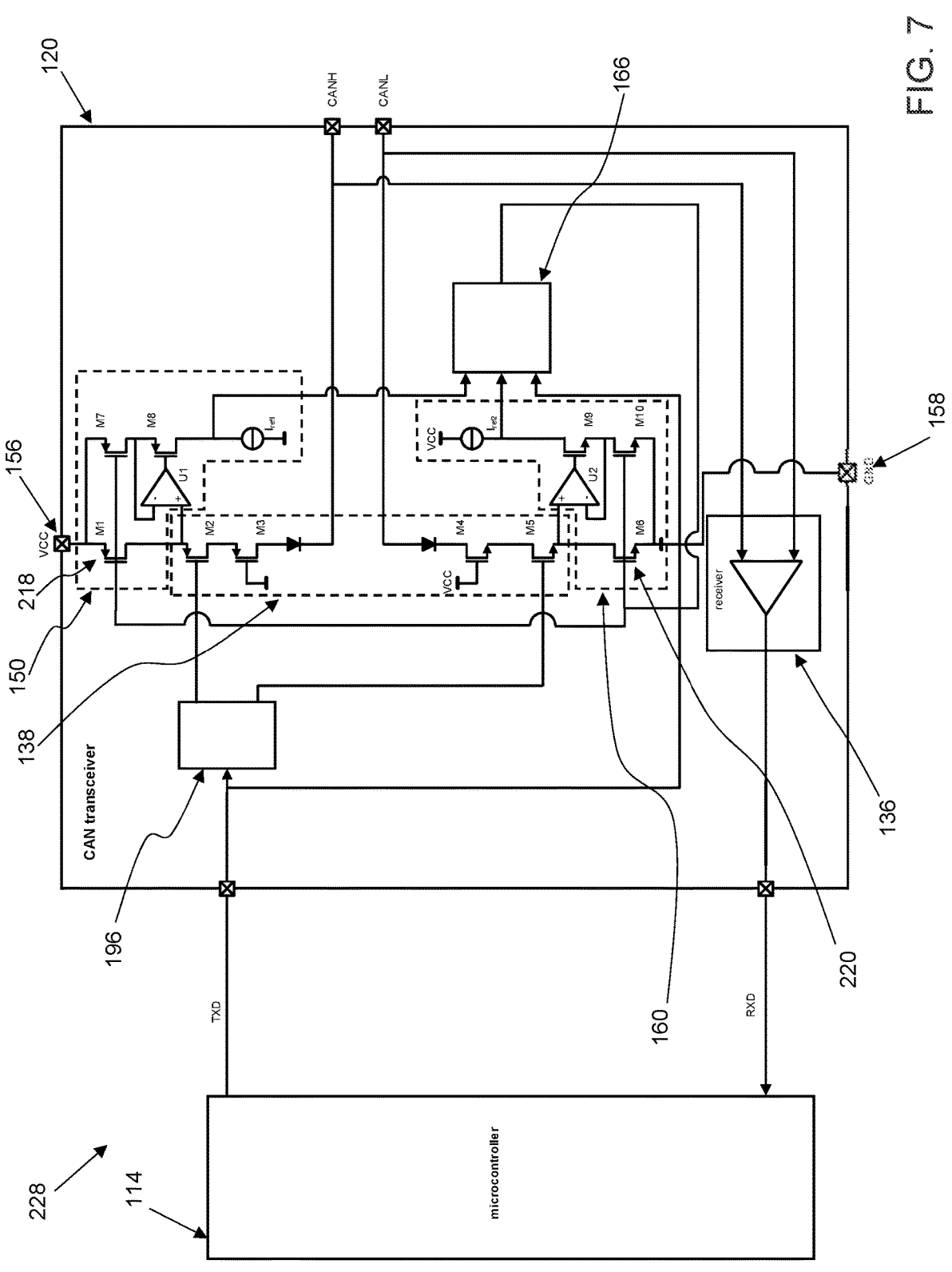

FIGS. 6 and 7 each schematically illustrate an example of a further embodiment of the transceiver 120, preferably based on the embodiment of the transceiver 120 of FIG. 4 and/or FIG. 3. Therefore, for the embodiment of the transceiver 120 of FIG. 6 and/or FIG. 7, reference is made in each case to the preferred explanations, preferred features, technical effects and advantages as explained for the transceiver 120 of FIG. 4 and/or FIG. 3. Purely as a precaution, it is pointed out that the embodiment of the transceiver 120 of FIG. 6 may, in an example, further comprise the features of the transceiver 120 previously mentioned in connection with FIG. 5.

In an example, the evaluation unit 166 may be configured to generate the control signal in response to a detected error sequence such that the fault of the transmitter 138 is indirectly represented by the control signal. For example, the control signal may represent a control command to disable the transmitter 138 and/or a control command to activate a shutdown unit to disable the transmitter 138.

In an example, the transceiver 120 comprises at least one shutdown unit 218, 220. Preferably, each shutdown unit 218, 220 is configured to at least partially disable the transmitter 138 based on the control signal.

In an example, the evaluation unit 166 is coupled to each shutdown unit 218, 220 to send the control signal to each of the at least one shutdown unit 218, 220.

In an example, a first shutdown unit 218 is integrated into the first sensor unit 150. In an example (not shown), a first shutdown unit 218 is not or not fully integrated into the first sensor unit 150. Preferably, the transceiver 120 comprises another signal connection 224 extending from the evaluation unit 166 to the first shutdown unit 218. In an example, the evaluation unit 166 may be configured to send the control signal to the first shutdown unit 218 via the signal connection 224. In an example, the first shutdown unit 218 is configured to interrupt the electrical connection between the first supply terminal 156 of the transceiver 120 and the transmitter 138 based on the control signal. In an example, if the control signal represents a control command to disable the transmitter 138, and thus indirectly represents a fault of the transmitter 138, the first shutdown unit 218 may interrupt the electrical connection between the first supply terminal 156 of the transceiver 120 and the transmitter 138 in response to the received control signal. In another example, if the control signal does not represent a control command to disable the transmitter 138 or if no control command is generated by the evaluation unit 166, the first shutdown unit 218 may be configured in this case to not interrupt the electrical connection between the first supply terminal 156 of the transceiver 120 and the transmitter 138.

In an example, a second shutdown unit 220 is integrated into the second sensor unit 160. In an example (not shown), a second shutdown unit 220 is not or not fully integrated into the second sensor unit 160. Preferably, the transceiver 120 comprises another signal connection 222 extending from the evaluation unit 166 to the second shutdown unit 220. In an example, the evaluation unit 166 may be configured to send the control signal to the second shutdown unit 220 via the signal connection 222. In an example, the second shutdown unit 220 is configured to interrupt the electrical connection between the second supply terminal 158 of the transceiver 120 and the transmitter 138 based on the control signal. In an example, if the control signal represents a control command to disable the transmitter 138, and thus indirectly represents a fault of the transmitter 138, the second shutdown unit 220 may interrupt the electrical connection between the second supply terminal 158 of the transceiver 120 and the transmitter 138 in response to the received control signal. In another example, if the control signal does not represent a control command to disable the transmitter 138 or if no control command is generated by the evaluation unit 166, the second shutdown unit 220 may be configured in this case to not interrupt the electrical connection between the first supply terminal 158 of the transceiver 120 and the transmitter 138.

In an example, the CAN transceiver 120 comprises the first shutdown unit 218 and the second shutdown unit 220, wherein the two shutdown units 218, 220 are configured to jointly disable the transmitter 138 based on the control signal. In an example, the two shutdown units 218, 220 may be configured to jointly completely interrupt the transmitter 138 from the first and second supply terminals 156, 158 based on the control signal.

In an example, if an error sequence is detected by means of the evaluation unit 166 and, inferred therefrom, a fault of the transmitter 138 is detected, the evaluation unit 166 may control the first and second shutdown units 218, 220 via the control signal so that the two shutdown units 218, 220 fully disable the transmitter 138. The disabling can effectively prevent the (faulty) transmitter 138 from blocking the CAN BUS 104 by sending out dominant bits or adversely affecting nodes 102 coupled to the CAN BUS 104.

In an example the CAN transmitter 138 may remain disabled until a next power cycle of the transceiver 120. In another example, the evaluation unit may reset the control signal upon a predefined interruption time. The evaluation unit 166 may be configured to check again, whether the fault of the transmitter 138 disappeared. If not, the evaluation unit 166 may change into a locked state, where the evaluation unit sends out the control signal independent of whether the transmitter 138 recovers In an example, after disabling the transmitter 138 the CAN transceiver 120 may be configured to re-enabling the transmitter 138 again after a predefined waiting period (following the disabling of the transmitter 138) and preferably also configured to check if the fault of the transmitter 138 occurs again. The number of re-enablings may be limited to a predefined number.

Figure 8:
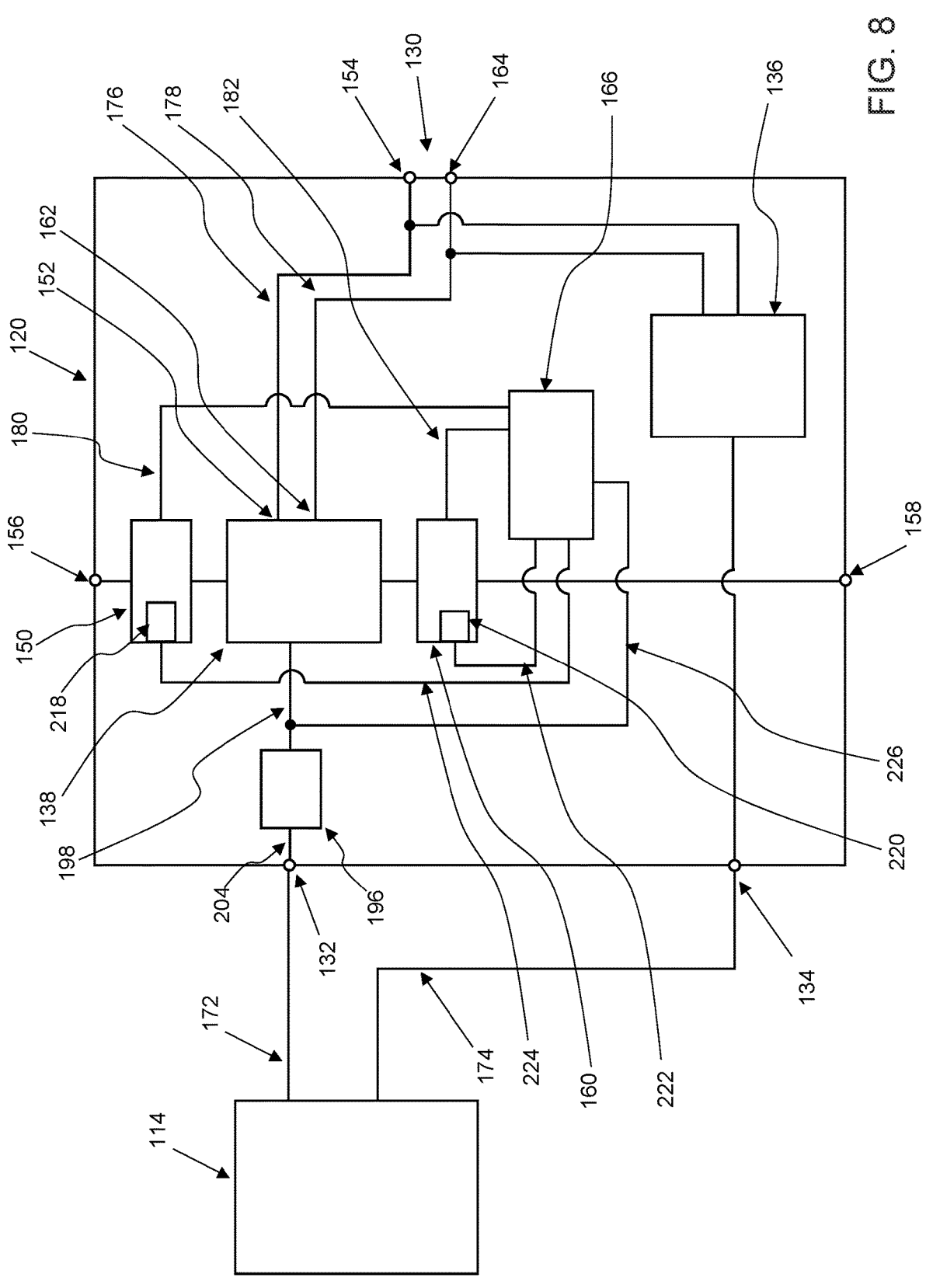

FIG. 8 schematically illustrates an example of a further embodiment of the transceiver 120, preferably based on the embodiment of the transceiver 120 of any of FIGS. 3 to 7. Therefore, for the embodiment of the transceiver 120 of FIG. 8, reference is made to the preferred explanations, preferred features, technical effects and advantages as explained for the transceiver 120 to the previous figures.

In connection with FIG. 3, it was explained in an example that the transceiver 120 may comprise a TXD signal error detector 196. As can be seen schematically from FIG. 8, the TXD transmit signal from the CAN controller 114 can reach the TXD signal error detector 196 via the TXD interface 132 and the signal connection 194. In an example, the TXD signal error detector 196 is configured to detect a sequence of at least six consecutive identical bits in the TXD transmit signal as a TXD error. Further, the TXD signal error detector 196 may be configured to stop forwarding the TXD transmit signal to the signal connection 198 upon detecting the TXD error. The TXD signal error detector 196 may further be configured to forward the TXD transmit signal from the signal connection 194 to the signal connection 198 if the TXD signal error detector 196 does not detect a TXD error. The TXD signal error detector 196 has the advantage that preferably no erroneous TXD transmit signal reaches the transmitter 138. If, nevertheless, a CAN BUS signal is generated by the transmitter 138 that represents a sequence of six consecutive dominant bits, it can be derived that there is a fault of the transmitter 138. This fault of the transmitter 138 may be detected by means of an embodiment of the transceiver 120, as previously explained with reference to FIGS. 3-7.

In an example, a further fault of the transmitter 138 may occur if the TXD transmit signal arriving at the transmitter 138 via the signal connection 198 represents a dominant bit, but a CAN BUS signal is generated by the transmitter 138 that does not represent said dominant bit.

In an example, the evaluation unit 166 is coupled to the TXD interface 132 of the transceiver 120 to receive the digital TXD transmit signal. In an example, the transceiver 120 may comprise another signal connection 226 extending from the signal connection 198 to the evaluation unit 166. As a result the digital TXD transmit signal preferably reaches both the transmitter 138 and the evaluation unit 166.

In an example, the evaluation unit 166 is configured to observe whether a dominant bit represented by the TXD transmit signal is also represented as a dominant bit by the CAN BUS signal. As previously explained, the evaluation unit 166 is preferably configured to detect any dominant bit represented by the CAN BUS signal based on the transmitter current. Preferably, the evaluation unit 166 is configured to detect each dominant bit that is represented by the TXD transmit signal. In an example, the evaluation unit 166 may be configured to observe whether a dominant bit detected in the TXD transmit signal is also represented as a dominant bit by the CAN BUS signal.

In an example, the evaluation unit 166 is configured to trigger a positive detection of a transmission error if the result of the observation indicates that a dominant bit represented by the TXD digital transmit signal is not also represented by the CAN BUS signal. In an example, the transmission error may be another example of an fault of the transmitter 138.

In an example, the evaluation unit 166 of the transceiver 120 may be configured to (also) generate the control signal in response to a positive detection of the transmission error. Also in this case, the control signal may directly or indirectly represent the fault of the transmitter 138. Preferably, reference is made with respect to the control signal to the preferred explanations, preferred features, technical effects and advantages as previously explained, for example, in connection with FIGS. 5-7.

In an example, the transceiver 120, and preferably the evaluation unit 166 of the transceiver 120, is configured to send an error signal to the CAN controller 114 via the interface 214 of the transceiver 120 in response to a detected error sequence and/or in response to a detected transmission error. The error signal may differ from the control signal. The error signal may directly or indirectly represent the detected error sequence, the detected transmission error, and/or generally the fault of the transmitter 138.

In an example, the transceiver 120, and preferably the evaluation unit 166 of the transceiver 120, is configured to generate the control signal in response to the detected error sequence and/or in response to a detected transmission error.

Further, the evaluation unit 166 may be configured to control the at least one shutdown unit 218, 220 via the control signal such that the respective shutdown unit 218, 220 fully or at least partially disables the transmitter 138 in response to the control signal.

Figure 9:
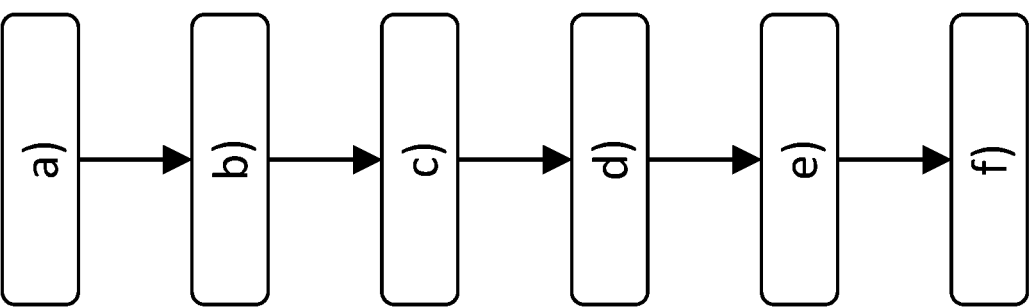
FIG. 9 shows a simplified flow chart of a method.
Figure 9:

FIG. 9 schematically illustrates an example of an embodiment of the method according to the present disclosure. The method is for a CAN transceiver 120 having a CAN BUS interface 130, a TXD interface 132, an RXD interface 134, a receiver 136 coupled to the CAN BUS interface 130 and the RXD interface 134, and a transmitter 138 coupled to the TXD interface 132 and the CAN BUS interface 130, the method comprising the following steps a) through f): a) Receiving a digital TXD transmit signal, representing a frame comprising a plurality of bits, over the TXD interface 132 from a CAN controller 114; b) Generate a CAN BUS signal that represents the bits of the frame in a sequence at the CAN BUS interface 130; c) Measuring an electrical current of the transmitter 138, referred to as the transmitter current; d) Detect each dominant bit represented by the CAN BUS signal based on the transmitter current; e) Detecting an error sequence of at least six consecutive dominant bits known based on the transmitter current; and f) Generating a control signal in response to a detected error sequence, the control signal representing a fault of the transmitter 138.

With respect to the method, reference is made to the preferred explanations, preferred features, technical effects and advantages in an analogous manner as previously explained for the CAN transceiver 120 in connection with FIGS. 1-8.

Although the described exemplary embodiments disclosed herein focus on devices, systems, and methods for using same, the present disclosure is not necessarily limited to the example embodiments illustrate herein. For example, various embodiments of providing The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first", "second", "third", and "fourth" are used to arbitrarily distinguish between the elements such terms describe. Thus, these terms are not necessarily intended to indicate temporal or other prioritization of such elements.

The invention claimed is:

1. A Controller Area Network, CAN, transceiver, comprising:
   a CAN BUS interface,
   a transmit data, TXD, interface,
   a receive data, RXD, interface,
   a receiver coupled to the CAN BUS interface and the RXD interface, and
   a transmitter coupled to the TXD interface and the CAN BUS interface,
      wherein the transceiver is configured to receive, via the TXD interface, from a CAN controller, a digital TXD transmit signal representing a frame comprising a plurality of bits,
      wherein the transmitter is configured to generate, at the CAN BUS interface, a BUS signal representing the bits of the frame in a sequence,
      wherein the transceiver is configured to measure an electrical current of the transmitter, referred to as a transmitter current,
      wherein the transceiver is configured to detect each dominant bit represented by the BUS signal based on the transmitter current,
      wherein the transceiver is configured to detect an error sequence of at least six consecutive dominant bits being detected based on the transmitter current, and
      wherein the transceiver is configured to generate a control signal representing a fault of the transmitter in response to a detected error sequence.

2. The CAN transceiver of claim 1, wherein the transceiver comprises a first sensor unit, which is arranged and/or configured to measure a first current to supply the transmitter, wherein the first current forms at least a part of the transmitter current.

3. The CAN transceiver according to claim 2, wherein the transceiver comprises first and second supply terminals for supplying electrical current to the transceiver, wherein the first sensor unit is coupled between the first supply terminal and the transmitter.

4. The CAN transceiver of claim 2, wherein the transceiver comprises an evaluation unit connected to the first sensor unit such that a sensor signal from the first sensor unit can be transmitted to the evaluation unit, wherein the evaluation unit is configured to compare the first current with a predefined first current threshold value and wherein the evaluation unit is configured to trigger a positive detection of a dominant bit represented by the BUS signal if the result of the comparison indicates that the first current is greater than the first current threshold value.

5. The CAN transceiver of claim 4, wherein the transceiver is configured to detect a first time duration of a plurality of successive dominant bits detected based on the transmitter current, wherein the evaluation unit is configured to compare the first time duration with a predefined reference time duration, and wherein the evaluation unit is configured to trigger a positive detection of the error sequence if a result of the comparison indicates that the first time duration is larger than the reference time duration.

6. The CAN transceiver of claim 4, wherein the evaluation unit is configured to generate a control signal representing a fault of the transmitter in response to a detected error sequence.

7. The CAN transceiver of claim 4, wherein the evaluation unit is coupled to the TXD interface to receive the TXD digital transmit signal, wherein the evaluation unit is configured to observe whether a dominant bit represented by the TXD transmit signal is also represented as a dominant bit by the BUS signal, wherein the evaluation unit is configured to trigger a positive detection of a transmission error if the result of the observation indicates that the dominant bit represented by the digital TXD transmit signal is not represented by the BUS signal.

8. The CAN transceiver claim 7, wherein the evaluation unit is configured to generate the control signal in response to a positive detection of the transmission error.

9. The CAN transceiver of claim 1, wherein the transceiver comprises a second sensor unit, which is arranged and/or configured to measure a second current to supply the transmitter, wherein the second current forms at least a part of the transmitter current.

10. The CAN transceiver of claim 9, wherein the transceiver comprises first and second supply terminals for supplying electrical current to the transceiver, wherein the second sensor unit is coupled between the second supply terminal and the transmitter.

11. The CAN transceiver of claim 1, wherein the transceiver comprises a first sensor unit, which is arranged and/or configured to measure a first current to supply the transmitter, wherein the transceiver comprises a second sensor unit, which is arranged and/or configured to measure a second current to supply the transmitter, wherein the transceiver is configured to detect each dominant bit represented by the BUS signal based on the first and second currents.

12. The CAN transceiver of claim 1, wherein the transceiver comprises at least one shutdown unit configured to at least partially deactivate the transmitter based on the control signal.

13. The CAN transceiver of claim 12, wherein the transceiver comprises a first shutdown unit and a second shutdown unit, wherein the first and second shutdown units are configured to jointly deactivate the transmitter based on the control signal.

14. The CAN transceiver of claim 13, wherein an evaluation unit is coupled to each shutdown unit to transmit the control signal to each of the at least one shutdown unit.

15. The CAN transceiver claim 1, wherein the transceiver is configured to transmit an error signal to the CAN controller via a further interface of the transceiver in response to a detected error sequence or a detected transmission error.

16. A CAN system, comprising a CAN controller and a CAN transceiver according to claim 1, wherein the CAN controller is connected via respective signal connections to the TXD interface of the transceiver and to the RXD interface of the transceiver.

17. A method for a Controller Area Network, CAN, transceiver comprising a CAN BUS interface, a transmit data, TXD, interface, a receive data, RXD, interface, a receiver coupled to the CAN BUS interface and RXD interface, and a transmitter coupled to the TXD interface and the CAN BUS interface, and wherein the method comprises the steps of:

receiving a digital TXD transmit signal representing a frame comprising a plurality of bits via the TXD interface from a CAN controller; generating a BUS signal representing the bits of the frame in a sequence at the CAN BUS interface;

measuring an electrical current of the transmitter, referred to as a transmitter current;

detecting each dominant bit represented by the BUS signal based on the transmitter current;

detecting an error sequence of at least six successive dominant bits detected based on the transmitter current; and generating a control signal in response to a detected error sequence, wherein the control signal represents a fault of the transmitter.

18. The method of claim 17, wherein the transceiver comprises a first sensor unit, wherein in step c) first current to supply the transmitter is measured with the first sensor unit, wherein the first current forms at least a part of the transmitter current.

19. The method of claim 18, wherein the transceiver comprises first and second supply terminals for supplying electrical current to the transceiver, wherein the first sensor unit is coupled between the first supply terminal and the transmitter.

20. The method of claim 18, wherein:

the transceiver comprises an evaluation unit connected to the first sensor unit;

the method comprises step c1) as a sub-step of step c):

c1) Transmitting a sensor signal from the first sensor unit to the evaluation unit;

the method comprises step d1) as a sub-step of step d):

d1) Comparing the first current with a predefined first current threshold value at the evaluation unit; and the method comprises step d2) as a further sub-step of step d):

d2) Triggering a positive detection of a dominant bit represented by the BUS signal at the evaluation unit if the result of the comparison indicates that the first current is greater than the first current threshold value.

* * * * *